United States Patent
Kahn

(10) Patent No.: US 7,620,894 B1
(45) Date of Patent: Nov. 17, 2009

(54) AUTOMATIC, DYNAMIC USER INTERFACE CONFIGURATION

(75) Inventor: Jessica Kahn, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 487 days.

(21) Appl. No.: 10/682,645

(22) Filed: Oct. 8, 2003

(51) Int. Cl.
G06F 3/00 (2006.01)

(52) U.S. Cl. .............. 715/707; 715/708; 715/745; 715/747; 715/789; 715/811; 715/813

(58) Field of Classification Search .......... 715/707, 715/705, 708, 715, 741, 744, 745, 747, 811, 715/813, 789
See application file for complete search history.

(56) References Cited

U.S. PATENT DOCUMENTS

| | | | |
|---|---|---|---|
| 5,115,501 A * | 5/1992 | Kerr | 707/9 |
| 5,287,448 A | 2/1994 | Nicol et al. | |
| 5,428,733 A | 6/1995 | Carr | |
| 6,263,346 B1 * | 7/2001 | Rodriquez | 707/201 |
| RE37,431 E * | 10/2001 | Lanier et al. | 706/58 |
| 6,377,286 B1 * | 4/2002 | Hochmuth | 715/810 |
| 6,400,996 B1 * | 6/2002 | Hoffberg et al. | 700/83 |
| 6,542,163 B2 * | 4/2003 | Gorbet et al. | 715/711 |
| 6,917,958 B1 * | 7/2005 | Howe et al. | 709/203 |
| 6,981,242 B2 * | 12/2005 | Lehmeier et al. | 717/122 |
| 7,080,321 B2 * | 7/2006 | Aleksander et al. | 715/708 |
| 2003/0030668 A1 * | 2/2003 | Morrison | 345/745 |
| 2003/0046401 A1 * | 3/2003 | Abbott et al. | 709/228 |
| 2004/0066414 A1 * | 4/2004 | Czerwinski et al. | 345/781 |
| 2005/0015728 A1 * | 1/2005 | Ragan et al. | 715/765 |
| 2005/0120313 A1 * | 6/2005 | Rudd et al. | 715/866 |

OTHER PUBLICATIONS

Johnson et al, published article "Intelligent User Interface Prompt Level", published in Jun. 1992, pp. 1, 2.*
"The Ghost in Your Machine" [online], Aug. 25, 2003, BusinessWeek Online, [retrieved Sep. 29, 2003]. Retrieved from the Internet: <URL: http://www.businessweek.com/technology/content/aug2003/tc20030825_4912_tc121.htm>.

* cited by examiner

*Primary Examiner*—Weilun Lo
*Assistant Examiner*—Tuyetlien T Tran
(74) *Attorney, Agent, or Firm*—Fenwick & West LLP

(57) ABSTRACT

Markers that describe a user's actions are monitored in order to determine his or her level of proficiency with a user interface. A proficiency level is determined based on the markers. The proficiency level is adjusted periodically or in response to trigger events, to provide updated proficiency level information as the user becomes more experienced. One or more user interface features are automatically configured according to the detected proficiency level, so that the user is presented with an interface that is appropriate for his or her level of proficiency.

61 Claims, 4 Drawing Sheets

AUTOMATIC, DYNAMIC USER INTERFACE CONFIGURATION

BACKGROUND OF THE INVENTION

1. Field of the Invention

The present invention relates generally to user interfaces, and more particularly to automatically and dynamically adjusting characteristics of a user interface in response to a user's proficiency.

2. Description of the Related Art

User interfaces for computer systems have become increasingly sophisticated over the years. As software developers have added more and more features to operating systems and software applications, they have struggled to provide easy-to-use mechanisms for accessing and using these features. Some features are of value to experienced users but are rarely needed by novices. The increased complexity these features add to a user interface can be a significant burden to novice users, as it can make it more difficult for such users to find the commands they are looking for when the commands are buried within complex menus containing esoteric commands.

In addition, some operations are simple when a number of default assumptions are made as to various options, but are more complex if the user needs to specify these assumptions. A novice user would rather have the software assume the default answers to the various options, while a more experienced user would prefer to have greater control over the operation by being given the opportunity to manually specify many of the options. For example, when copying files to a CD, a novice user may want the computer to simply assume standard default configuration options, while an experienced user would generally want to have more control over the copying operation.

Some operating systems and applications provide configuration options that allow a user to specify a user interface level, such as a "beginner" or "advanced." If the user selects the beginner level, he or she is presented with simplified menus and command structures, which are generally a subset of those provided at the advanced level. Other user interfaces provide techniques for customizing the menus and commands by selecting from a list of commands; selected commands are included, while other commands are omitted. One limitation of such approaches is that the user must select and/or customize the user interface level him- or herself; many users, particularly novice users, do not know how to make such adjustments, or simply do not bother to make them.

In addition, such solutions do not allow for the fact that a user may become more proficient with time, and therefore may be ready to move to a more advanced level. Instead of providing a dynamic user mode, such solutions are essentially static, and require the user to take affirmative steps in order to change the user mode to accommodate a higher proficiency level. Again, many users simply do not bother to make such changes.

Other limitations of existing configuration schemes are:
users often overestimate their capabilities;
users may find it annoying to be queried as to their capabilities; and
a perceived stigma associated with selecting a "beginner" level may cause users to inappropriately select "advanced" level.

As a result, such user interfaces are often misconfigured for the particular user. Novice users may end up with an interface that is too confusing and complex for their needs, and experienced users may become frustrated when needed commands are unavailable or difficult to access. In addition, by failing to adapt to users' changing needs and proficiency levels, existing solutions do not provide users with the ability to become more proficient by learning and discovering new features of the software. A novice user may never become aware of advanced features that are absent from the beginner version of the user interface, and may never even become aware that an advanced version of the user interface exists.

Some user interfaces attempt to adapt to user needs by hiding menu commands that are less frequently used, and/or by changing the order of menu commands according to frequency of use. Such attempts are somewhat dynamic in nature, as they react to monitored user behavior. However, these techniques are based solely on frequency of use of commands, and fail to take into account user proficiency or other factors in deciding which menu items should be hidden or displayed. In addition, the default or initial state of such systems usually displays all menu commands, which can be overwhelming or intimidating for novice users.

What is needed is an automatic, dynamic system and method of adjusting the characteristics of a user interface based on monitored user proficiency. More proficient users could automatically be presented with a more sophisticated user interface with a broader range of commands and options, while novice users could automatically be presented with a simplified interface. What is further needed is a system and method that adapts to changing proficiency level as the user learns more about the software, and that increases the level of complexity of the user interface accordingly. What is further needed is a system and method that does not require any effort on the part of the user to configure the user interface appropriately based on his or her level of proficiency.

SUMMARY OF THE INVENTION

According to the present invention, markers that describe a user's actions are monitored in order to determine his or her level of proficiency. The user interface is adjusted accordingly, so that the user is automatically presented with an interface that is appropriate for his or her level of proficiency.

A set of proficiency markers relevant to user proficiency is defined. A background process provided in an application, or the operating system, or a separate utility, collects information from the markers to determine how the user is interacting with the system. The background process aggregates the collected information to determine and store a proficiency level according to the markers. Applications and/or the operating system can access the stored proficiency level so that they can modify their user interfaces accordingly. Based on the proficiency level, applications and/or the operating system can adjust the layout, organization, and command structure of their interfaces, as well as to certain elements of their content. For example, a help system could display different types of help text depending on the determined proficiency level: for novice users, basic help text might be displayed; while for experienced users, more advanced help text might be displayed.

The system and method of the present invention periodically or continually retrieves and analyzes stored markers to update stored proficiency levels, so that applications and/or the operating system can detect changes in the user's proficiency level and adjust their user interfaces accordingly. In this manner, the present invention allows the system to grow in complexity as the user's proficiency level increases, providing a technique for presenting each user with an interface that is appropriate to his or her level. As described in more detail below, the system and method of the present invention also provide commands and configuration options for partially or completely disabling the automatic user mode adjustment operation, or for restricting changes to particular areas or elements of the software.

User interface adjustment can be selectively performed based on monitored proficiency for certain aspects or elements of the software. For example, within a word processing application a user may become proficient in manipulating tables and cells, but may remain a novice with respect to mail-merge. By detecting user interaction that indicates differing levels of proficiency for different aspects of the software, the present invention could provide more complex and sophisticated commands for the tables and cells areas of the program, while retaining a simplified interface for mail-merge-related functionality.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
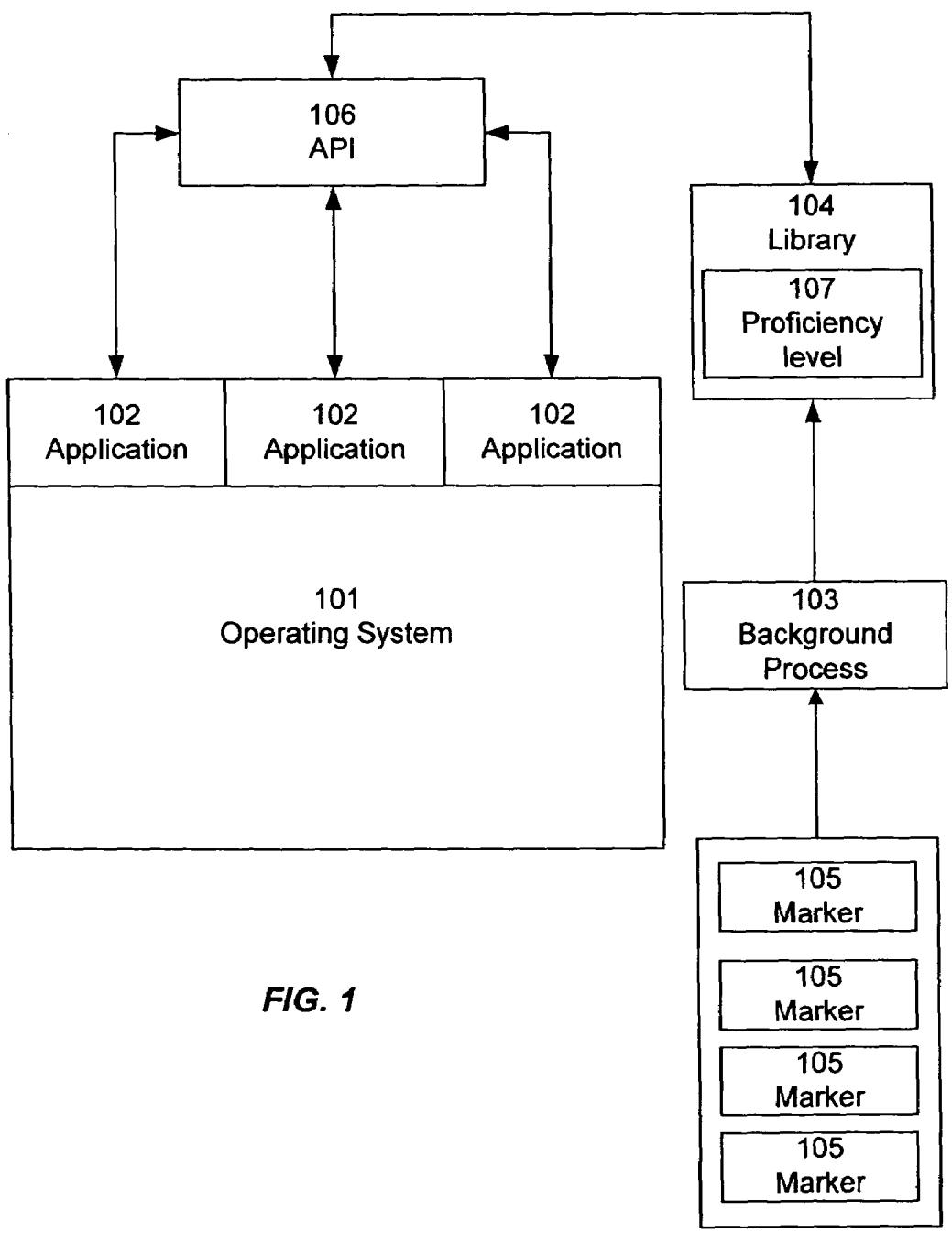
FIG. 1 is a block diagram depicting a system for practicing the present invention according to one embodiment.

Referring now to FIG. 1, there is shown a block diagram depicting a system for practicing the present invention according to one embodiment. The various functional components shown therein can be implemented, for example, in a conventional personal computer such as a Power Macintosh G4 running an operating system (OS) 101 such as MacOS X (both available from Apple Computer, Inc., of Cupertino, Calif.), along with one or more applications 102. For illustrative purposes, three applications 102 are shown in FIG. 1, although one skilled in the art will recognize that any number of applications 102 may be running on the computer system at any given time. In addition, one skilled in the art will recognize that the present invention can be implemented in other contexts, such as for example in an environment for running web-resident applications from a client machine (provided, for example, by an application service provider).

Background process 103, such as a daemon, periodically retrieves and reads markers 105 to determine an estimated user proficiency level 107. Background process 103 then stores a representation of the user proficiency level 107 in library 104 that is accessible to applications 102 (and to operating system 101) via an application programming interface (API) 106. Each application 102 and/or operating system 101 can then configure its user interface according to the determined proficiency.

Background process 103 can be implemented as part of operating system 101, or it can be a plug-in or other type of application. In an alternative embodiment, the process for monitoring user proficiency can be incorporated into the application whose interface will be modified without support from the operating system or other system components. In general, it is preferable if background process 103 runs without interfering with the user's experience in operating the computer. In one embodiment, background process 103 runs continuously to generate and update user proficiency level 107 in library 104. In another embodiment, background process 103 runs periodically (such as daily or weekly), or upon occurrence of a specified event (such as system startup, application launch, or the like).

Markers 105 can represent any facet of user interaction with an application 102 or operating system 101, and can include any available information describing or summarizing behavior or usage patterns. Any number of markers 105 can contribute to an estimate of user proficiency; the particular contributing markers 105 are selected based on the degree to which they accurately indicate proficiency. When more than one marker 105 contributes to the proficiency determination, the relative contribution of the markers 105 can be determined based on predefined relative weights. In one embodiment, markers 105 correspond to (and/or are derivable from) data that is already regularly stored by an application 102 or operating system 101, so that there is no additional burden involved in collecting relevant data for proficiency estimation. In another embodiment, some or all of the markers 105 are specially derived for the purpose of determining user proficiency; thus, they represent a summary or description of monitored user behavior.

For example, if a user interface is to be configured based on user proficiency in a specific aspect of a word processing application interface, in one embodiment an API would set up the markers to be monitored, and would read the markers to determine a proficiency level in the specific aspect of interest. The operating system could monitor a set of markers that are available to it, and could further provide access to proficiency levels for an application or aspect of an application based on the monitored markers. Applications, plug-ins, and other software components could set new markers using the same API, and further could categorize the markers and extract proficiency levels by reading particular markers of interest. In this manner, applications can determine overall proficiency, application proficiency, and/or proficiency for a particular aspect of an application.

Library 104 contains some representation of user proficiency level 107 that can be read by applications 102 via API 106. The representation of user proficiency can be an overall measure, or it can be a representation of a marker 105 or combination of markers 105. In one embodiment, library 104 contains representations of several proficiency levels 107. For example, different proficiency levels may apply to different applications 102, or to different aspects of a particular application 102. This reflects the fact that a user may become adept at some applications 102 while remaining a novice with respect to other applications 102; or the user may become proficient at some features of an application 102 but not others. Each proficiency level can therefore be determined using a different set of markers 105, depending upon a determination as to which types of behavior and/or statistics tend to indicate proficiency level for the particular application or feature set within an application. API 106 provides the appropriate interface to allow application 102 to retrieve the relevant proficiency level representation 107 for that application 102 or for the portion of application 102 being configured.

For example, in an e-mail application, a user who has configured a number of e-mail accounts might be deemed more proficient than one who has only used a single default account. Thus, the number of e-mail accounts would be used as a marker 105 that, combined with other markers 105, provides an estimate of user proficiency for an e-mail application. A marker indicating the number of e-mail accounts is readily available from existing information that is used by the application 102 in its normal operations. An e-mail application 102 could therefore obtain, via library 104, a proficiency level 107 based on a marker 105 that indicates the number of e-mail accounts configured by a user, combined with other markers 105.

Other examples of markers 105 that could be used to determine user proficiency include without limitation:
- number and organization of bookmarks in a Web browser application;
- degree to which certain system features have been customized by the user;
- number and types of peripherals connected to the system;
- number of applications being run concurrently (either current value or historical average);
- total system uptime; and
- whether or not the user has made use of certain advanced features.

Combinations of markers 105 can also be used. A proficiency level 107 can be derived by adding, averaging, or otherwise combining the values of two or more markers 105, weighted appropriately. Alternatively, a score based on two or more markers 105 can be determined, and proficiency level 107 is determined by comparing the score with particular threshold levels. For example, a score can be determined by calculating:

$$S = U + 10F + 8A,$$

where U=total system uptime in days;
F=number of features customized by the user; and
A=average number of applications run concurrently.

A user having a score S exceeding 100 might be given the highest proficiency level 107; a score between 50 and 99 might correspond to medium proficiency level 107; and a score below 50 might correspond to beginner proficiency level 107.

In addition, for computer systems used by more than one user, each user may have a profile. Library 104 contains proficiency level 107 for each user, and provides access via API 106 to proficiency level 107 for the user that is currently logged in to the system.

In one embodiment, API 106 is available to applications 102, operating system 101, and/or other user interface level code within the computer system, such as OS libraries for providing user interfaces. Examples of such libraries include AppKit and High Level Toolbox, both of which are provided in MacOS X available from Apple Computer, Inc., of Cupertino, Calif.

Applications 102 and OS 101 use the proficiency level 107 from library 104 to configure their user interfaces to match the determined proficiency of the user. Examples of such configuration include without limitation:
- enabling or disabling certain commands, menu options, keyboard shortcuts, and the like;
- tailoring content, such as Help text, to match the proficiency level;
- changing the appearance of certain user interface elements (for example, changing the sizes of icons, or adding or removing text labels);
- enabling or disabling user help features such as on-screen tips and assistance; and
- enabling or disabling certain configuration options.

Figure 4:
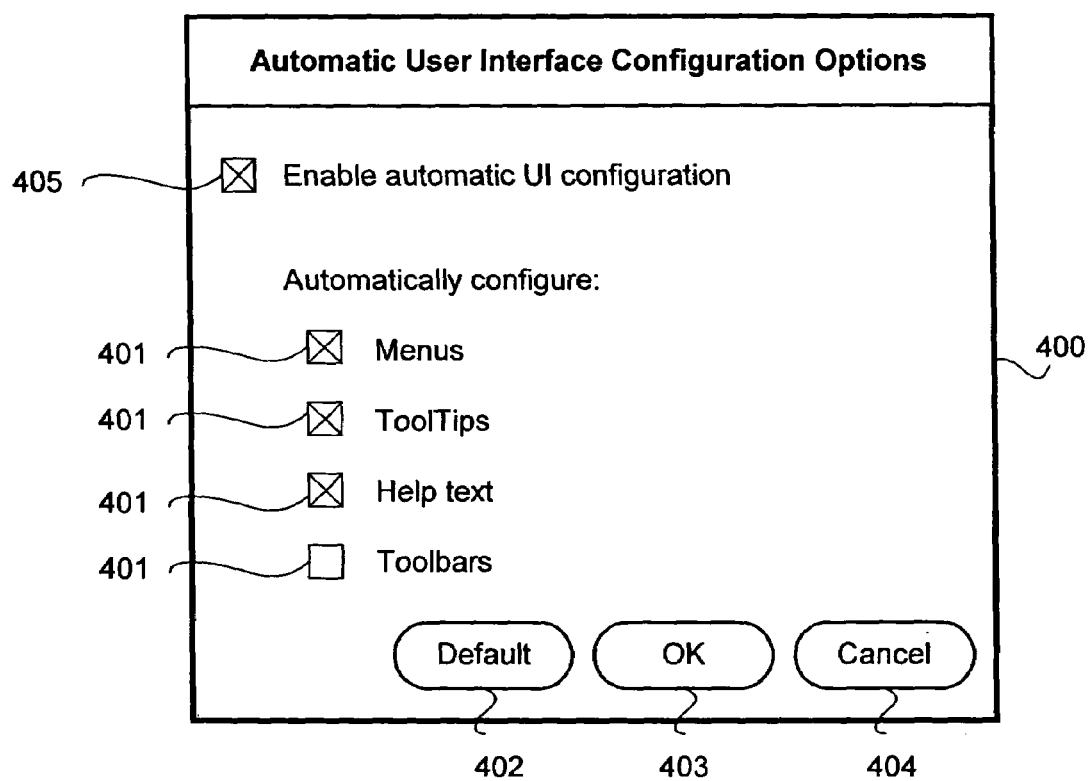
FIG. 4 is an example of a configuration dialog box for adjusting automatic configuration options according to one embodiment.

In one embodiment, users can enable or disable the automatic configuration scheme via a preferences or options screen, and can override the automatic configuration if desired. In one embodiment, users can enable certain types of automatic configuration while disabling other types. For example, a user can specify that menus, ToolTips, and Help text be automatically configured, but that Toolbars not be automatically configured. Such a selection is depicted in FIG. 4.

In one embodiment, applications potentially reconfigure their interfaces on a periodic basis, or upon startup, or upon occurrence of some other event. For example, an application 102 might check library 104 each time the application 102 launches, to determine whether the user's proficiency level 107 has changed, thus warranting a reconfiguration of the user interface. Alternatively, such checking may take place on a weekly basis, or upon user request, or at any other time. In one embodiment, when a change to a user interface is made, the user is alerted to the change, particularly when new features are added. The user can be given an opportunity to view a "What's New" screen or other description of the newly-added features, so that he or she can be made aware of the new functionally and thereby make better use of the system. In one embodiment, the user is given an opportunity to decline any new feature that is added, thereby overriding the system's determination that the new feature should be added.

The present invention thus provides a mechanism by which user proficiency can be discovered automatically and unobtrusively, and by which user interface features can be automatically configured to match the determined proficiency. The interface thus grows in complexity as the user's proficiency level increases. This allows all users, from novices to experts, to make more efficient use of the software applications 102, operating system 101, and the computer system as a whole.

Figure 2:
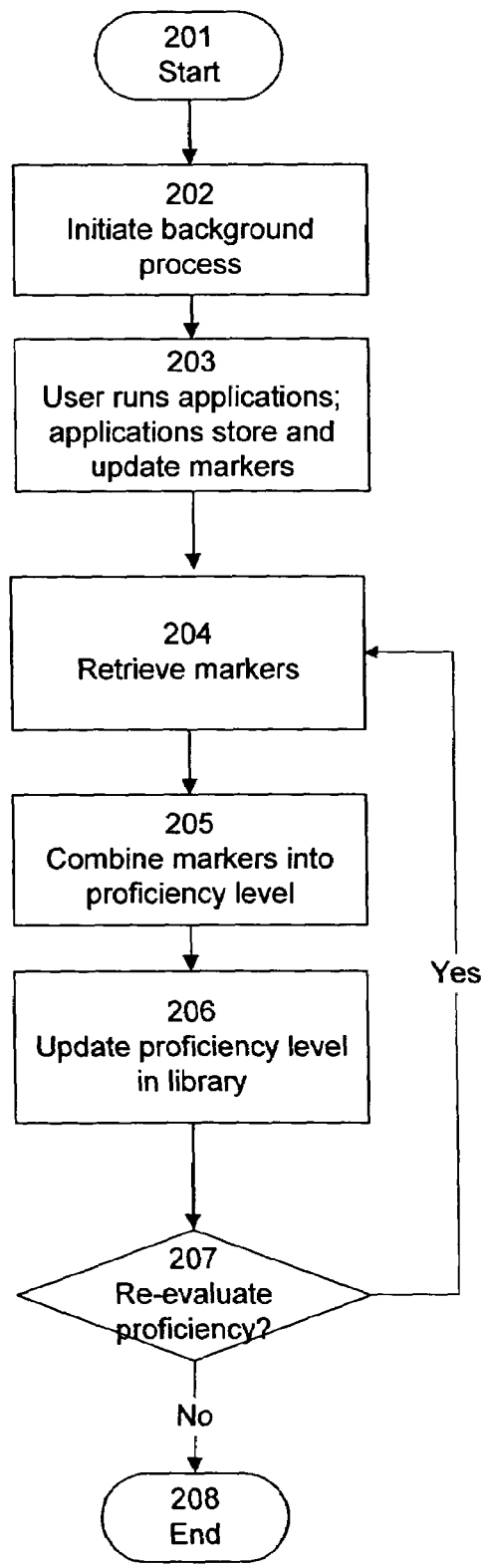
FIG. 2 is a flow chart depicting a method of updating a stored proficiency level according to one embodiment.

Referring now to FIG. 2, there is shown a method of updating a stored proficiency level according to one embodiment. Operating system 101 initiates 202 background process 103 for updating proficiency levels; this may occur, for example, upon system start-up, or upon user activation, or upon some trigger event. Then, the user runs 203 applications 102 normally. As applications 102 are run, they store in a marker storage device and update various data items that are identified as markers 105. As described above, such markers 105 may be information that is normally stored by applications 102, information that is specifically stored for purposes of assessing user proficiency, or a combination of both.

Background process 103 retrieves 204 stored markers 105 and combines 205 them to determine a proficiency level 107. As described above, proficiency level 107 can be specific to a particular application 102 or to OS 101, or it can be specific to particular features or components of an application 102, or it can apply to all applications 102. Background process 103 updates 206 proficiency level 107 in library 104 so that applications 102 can retrieve relevant proficiency level information 107 via API 106.

In one embodiment, background process 103 performs steps 204 through 206 periodically. In another embodiment, background process 103 performs steps 204 through 206 in response to user activation, or in response to a triggering event such as startup, launch of an application 102, or the like. If background process 103 determines 207 that proficiency level 107 should be re-evaluated (for example, upon occurrence of a triggering event), steps 204 through 206 are repeated.

The above description sets forth an example of a method of updating proficiency levels 107. The method is described in terms of the operation of a background process 103. However, one skilled in the art will recognize that the steps of FIG. 2 may be performed by any computer-implemented process, software, or system, and need not be performed by a background process 103. For example, the steps may be performed by a foreground application that runs upon startup.

Figure 3:
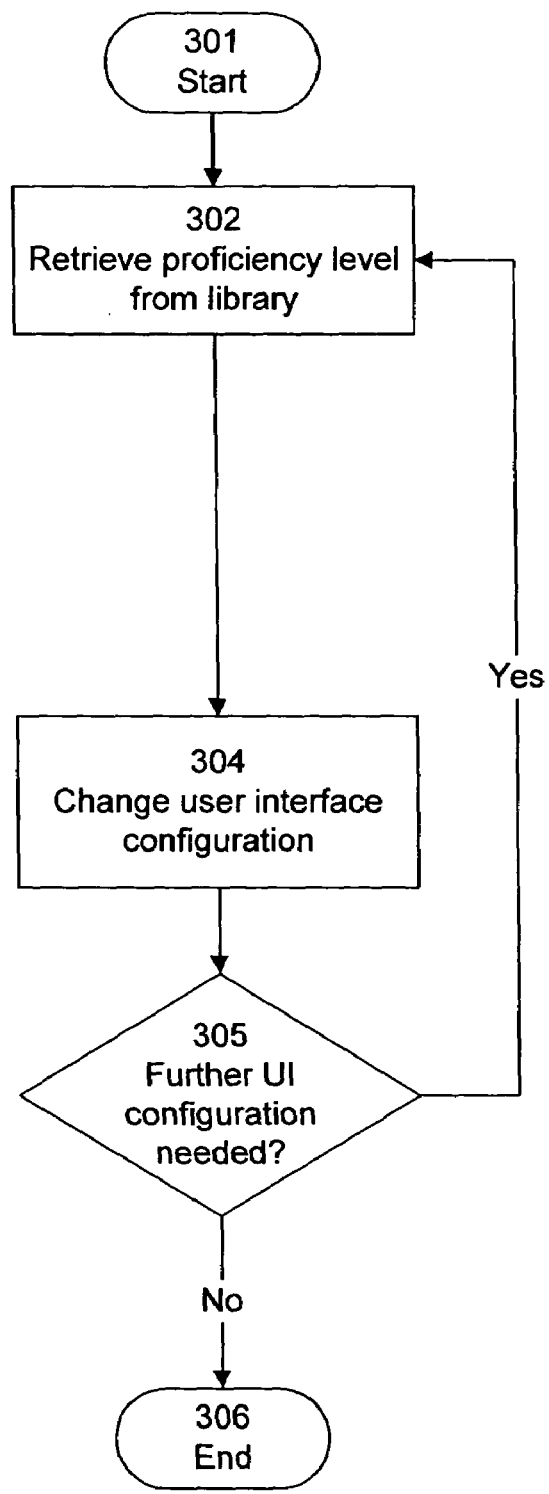
FIG. 3 is a flow chart depicting a method of automatically configuring a user interface according to one embodiment.

Referring now to FIG. 3, there is shown a method of automatically configuring a user interface according to one embodiment. The method of FIG. 3 may be performed, for example, by applications 102 or by OS 101 via API 106. As described above, API 106 contains the function calls and other appropriate modules for accessing proficiency levels 107 stored in library 104. Applications 102 or OS 101 may perform the steps of FIG. 3 periodically, or in response to user activation, in response to a triggering event such as startup, launch of an application, or the like. In one embodiment, application 102 can register a callback with library 104, so that when certain markers 105 change, library 104 notifies application 102 (via the callback) that a proficiency level update may be warranted. One possible triggering event is the detection of a change to proficiency level 107 in library 104; thus an application 102 might perform the method of FIG. 3 when step 206 of FIG. 2 has been performed. Alternatively, the method of FIG. 3 can be performed independently of the steps of FIG. 2.

Proficiency level 107 is retrieved 302 from library 104. In one embodiment, where multiple proficiency levels 107 exist for different applications 102 and/or OS 101, only the relevant level 107 is retrieved. Based on the retrieved proficiency level 107, the user interface configuration is changed 304. The particular changes made to the user interface configuration can vary from application 102 to application 102. As described above, such changes may include enabling or disabling commands, changing help text, and the like.

If further UI configuration is needed 305, for example upon detection of a triggering event, steps 302 and 303 are repeated.

In one embodiment, the user is given an opportunity to control or override the automatic user interface configuration. For example, an application 102 or OS 101 may provide a command for accessing an "options" or "preferences" dialog box that allows the user to indicate whether or not automatic configuration should be enabled, and which UI features should be automatically configured. In one embodiment, the configuration options apply to all applications 102 and OS 101; in another embodiment, the configuration options apply to a specific application 102 or OS 101.

Referring now to FIG. 4, there is shown an example of a configuration dialog box 400 for adjusting automatic configuration options according to one embodiment. Dialog box 400 may be displayed, for example, in response to a user selecting an "options" or "preferences" command from within application 102 or OS 101.

Checkbox 405 enables and disables the automatic UI configuration functionality described above. When checkbox 405 is unchecked, applications 102 do not perform automatic UI configuration. This may be enforced, for example, by having the API return a NULL or "no value" response when applications 102 query it for proficiency level, thus causing automatic UI configuration to be disabled. In one embodiment, when a user unchecks checkbox 405, the UI configuration currently in place is maintained; in another embodiment, the UI configuration reverts to a default configuration or to a user setting.

Checkboxes 401 provide controls for enabling and disabling the automatic UI configuration functionality with respect to particular areas of applications 102. For example, a user could indicate that he or she wishes to enable automatic configuration for menus, ToolTips, and help text, but not for Toolbars (as shown in FIG. 4).

Default button 402 reverts to a default setting. OK button 402 accepts the user's changes and dismisses dialog box 400. Cancel button 402 cancels the user's changes and dismisses dialog box 400.

One skilled in the art will recognize that the particular arrangement and items shown in FIG. 4 are merely exemplary, and that many other arrangements of dialog box 400 may be contemplated without departing from the essential characteristics of the present invention. For example, the configuration options for adjusting automatic configuration options may be provided within the context of a dialog box that also contains other configuration options related to other aspects of the application 102.

As will be understood by those familiar with the art, the invention may be embodied in other specific forms without departing from the spirit or essential characteristics thereof. The particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product comprising a computer-readable medium, system, apparatus, or any combination thereof. Accordingly, the disclosure of the present invention is intended to be illustrative, but not limiting, of the scope of the invention, which is set forth in the following claims.

What is claimed is:

1. A computer-implemented user interface configuration method, for configuring a user interface of an application program and a user interface of an operating system of a computer system, the computer system including a plurality of application programs, the method comprising:

storing a plurality of application program markers, each application program marker associated with one of the plurality of application programs, and indicating a user interaction with the associated one of the application programs;

storing a plurality of operating system markers, each operating system marker indicating a user interaction with the operating system, the operating system markers including an indication of a total number of currently opened application programs;

assigning weights to each of the plurality of application program markers and each of the plurality of operating system markers;

determining a weighted score as a function of a subset of the weighted operating system markers and a subset of the weighted application program markers;

determining a user proficiency level with respect to the user interface of the application program and the user interface of the operating system based upon the weighted score; and automatically configuring at least one functional component of the user interface of the application program and at least one functional component of the user interface of the operating system responsive to the user proficiency level.

2. The method of claim 1, wherein automatically configuring the at least one functional component of the user interface of the application program and the at least one functional component of the user interface of the operating system comprises:
  selecting at least one configuration option from a plurality of configuration options.

3. The method of claim 1, wherein automatically configuring the at least one functional component of the user interface of the application program and the at least one functional component of the user interface of the operating system comprises at least one selected from the group consisting of:
  enabling access to a functional user interface element;
  disabling access to a functional user interface element; and
  changing an appearance of a functional user interface element.

4. The method of claim 1, wherein automatically configuring the at least one functional component of the user interface of the application program and the at least one functional component of the user interface of the operating system comprises:
  providing a set of functions including:
    enabling access to a command;
    disabling access to a command;
    changing an appearance of a command;
    enabling access to a menu;
    disabling access to a menu;
    changing an appearance of a menu;
    enabling access to a button;
    disabling access to a button;
    changing an appearance of a button;
    enabling access to a shortcut; and
    disabling access to a shortcut; and
  selecting at least one of the provided functions to configure the functional component.

5. The method of claim 1, further comprising:
  outputting a notification of a change to user interface configuration.

6. The method of claim 1, further comprising:
  outputting a notification of at least one newly enabled user interface feature.

7. The method of claim 1, wherein determining the user proficiency level and automatically configuring the at least one functional component the user interface of the application program and the at least one functional component of the user interface of the operating system are performed responsive to a trigger event.

8. The method of claim 7, wherein the trigger event comprises user input requesting user interface configuration.

9. The method of claim 7, wherein the trigger event comprises application startup.

10. The method of claim 7, wherein the trigger event comprises system startup.

11. The method of claim 7, wherein the trigger event comprises a change in user behavior with respect to the user interface.

12. The method of claim 7, wherein the trigger event comprises user logon.

13. The method of claim 1, wherein determining the user proficiency level and automatically configuring the at least one functional component of the user interface of the application program and the at least one functional component of the user interface of the operating system are performed periodically.

14. The method of claim 1, wherein determining the user proficiency level comprises reading a stored user proficiency level derived from at least one weighted marker.

15. The method of claim 14, wherein the plurality of operating system markers further includes an indication of a historical usage of each user interface.

16. The method of claim 1, wherein the plurality of operating system markers further includes an indication of whether an element of either user interface has been used.

17. The method of claim 1, wherein the plurality of operating system markers further includes an indication of whether an element of the user interface of the operating system has been used a number of times exceeding a predetermined threshold.

18. The method of claim 1, wherein the plurality of application program markers further includes an indication of a total amount of time spent by a user using at least one of the plurality of application programs.

19. The method of claim 1, wherein the plurality of operating system markers further includes an indication of a historical average number of concurrently open application programs.

20. The method of claim 1, wherein the plurality of operating system markers further includes an indication of how many windows are open concurrently.

21. The method of claim 1, wherein the plurality of operating system markers further includes an indication of a historical average number of concurrently open windows.

22. The method of claim 1, wherein the plurality of operating system markers further includes an indication of a user-specified preference indicating a proficiency level.

23. The method of claim 1, wherein the plurality of application program markers includes an indication of web page visitation patterns.

24. The method of claim 1, wherein the plurality of application program markers includes an indication of historical usage of secure web pages.

25. The method of claim 1, wherein the plurality of application program markers includes an indication of historical usage of web pages having active content.

26. The method of claim 1, wherein:
  determining the user proficiency level comprises determining the user proficiency level with respect to a user interface component less than the entire user interface of the operating system; and
  automatically configuring the at least one functional component of the user interface of the application program and the at least one functional component of the user interface of the operating system comprises automatically configuring the user interface component without altering the configuration of the remainder of the user interface.

27. The method of claim 1, wherein:
  determining the user proficiency level comprises determining the user proficiency level with respect to a selected one of the plurality of application programs; and
  automatically configuring at least one functional component of the user interface of the application program and the at least one functional component of the user interface of the operating system comprises automatically configuring the user interface for the selected one of the plurality of application programs.

28. The method of claim 1, further comprising:
  responsive to user behavior with respect to either the application program user interface or the operating system user interface, storing a corresponding weighted marker;
  and wherein determining the weighted score comprises reading the stored weighted marker.

29. The method of claim 28, wherein:
storing the weighted marker is performed by a first application; and
reading the stored weighted marker is performed by a background process.

30. The method of claim 28, wherein:
storing the weighted marker is performed by a first application; and
reading the stored weighted marker is performed by a second application different from the first application.

31. The method of claim 28, wherein:
storing the weighted marker is performed by an operating system; and
reading the stored weighted marker is performed by the operating system.

32. The method of claim 31, wherein:
automatically configuring the at least one functional component of each user interface comprises modifying functional user interface elements that are supplied to the plurality of application programs and the operating system.

33. The method of claim 28, wherein:
storing the weighted marker is performed by an operating system; and
reading the stored weighted marker is performed by an application program.

34. The method of claim 1, wherein determining the weighted score comprises retrieving a plurality of stored weighted markers and aggregating the retrieved markers.

35. The method of claim 1, further comprising:
accepting user input overriding a selected one user interface configuration and specifying a desired configuration; and
responsive to the user input, configuring the selected one user interface according to the desired configuration.

36. The method of claim 1, wherein:
determining a user proficiency level with respect to a user interface comprises determining a user proficiency level with respect to a user interface of a web-resident application being run from a client machine; and
automatically configuring the at least one functional component of each user interface comprises automatically configuring at least one functional user interface element for the web-resident application.

37. A computer program product for configuring a user interface of an application program and a user interface of an operating system of a computer system, the computer system including a plurality of application programs, the computer program product comprising:
a computer-readable medium; and
computer program code, encoded on the medium, which the code is executed by the computer system, for:
storing a plurality of application program markers, each application program marker associated with one of the plurality of application programs, and indicating a user interaction with the associated one of the application programs;
storing a plurality of operating system markers, each operating system marker indicating a user interaction with the operating system, the operating system markers including an indication of a total number of currently opened application programs;
assigning weights to each of the plurality of application program markers and each of the plurality of operating system markers;
determining a weighted score as a function of a subset of the weighted operating system markers and a subset of the weighted application program markers;
determining a user proficiency level with respect to the user interface of the application program and the user interface of the operating system based upon the weighted score; and
automatically configuring at least one functional component of the user interface of the application program and at least one functional component of the user interface of the operating system responsive to the user proficiency level.

38. The computer program product of claim 37, wherein the computer program code for automatically configuring the at least one functional component of the user interface of the application program and the at least one functional component of the user interface of the operating system comprises computer program code for:
selecting at least one configuration option from a plurality of configuration options.

39. The computer program product of claim 37, wherein the computer program code for automatically configuring the at least one functional component of the user interface of the application program and the at least one functional component of the user interface of the operating system comprises at least one selected from the group consisting of:
computer program code for enabling access to a functional user interface element;
computer program code for disabling access to a functional user interface element; and
computer program code for changing an appearance of a functional user interface element.

40. The computer program product of claim 37, wherein the computer program code for automatically configuring the at least one functional component of the user interface of the application program and the at least one functional component of the user interface of the operating system comprises:
computer program code for enabling access to a command;
computer program code for disabling access to a command;
computer program code for changing an appearance of a command;
computer program code for enabling access to a menu;
computer program code for disabling access to a menu;
computer program code for changing an appearance of a menu;
computer program code for enabling access to a button;
computer program code for disabling access to a button;
computer program code for changing an appearance of a button;
computer program code for enabling access to a shortcut; and
computer program code for disabling access to a shortcut.

41. The computer program product of claim 37, wherein the computer program code for determining the user proficiency level and automatically configuring the at least one functional component of the user interface of the application program and the at least one functional component of the user interface of the operating system comprises computer program code for performing the determining and configuring steps responsive to a trigger event.

42. The computer program product of claim 37, wherein the computer program code for determining the user proficiency level and automatically configuring the at least one functional component of the user interface of the application program and the at least one functional component of the user interface of the operating system comprises computer program code for performing the determining and configuring steps periodically.

43. The computer program product of claim 37, wherein the computer program code for determining the user proficiency level comprises computer program code for reading a stored user proficiency level determined from at least one weighted marker.

44. The computer program product of claim 37, wherein:
the computer program code for determining the user proficiency level comprises computer program code for determining the user proficiency level with respect to a user interface component less than the entire user interface of the operating system; and
the computer program code for automatically configuring the at least one functional component of each user interface comprises computer program code for automatically configuring the functional user interface component without altering the configuration of the remainder of the user interface.

45. The computer program product of claim 37, wherein:
the computer program code for determining the user proficiency level comprises computer program code for determining the user proficiency level with respect to a selected one of the plurality of application programs; and
the computer program code for automatically configuring at least one functional component of each user interface comprises computer program code for automatically configuring the user interface for the selected one of the plurality of application programs.

46. The computer program product of claim 37, further comprising:
computer program code for, responsive to user behavior with respect to either user interface, storing a corresponding weighted;
and wherein the computer program code for determining the weighted score comprises computer program code for reading the stored weighted marker.

47. The computer program product of claim 37, wherein the computer program code for determining the weighted score comprises computer program code for retrieving a plurality of stored weighted markers and aggregating the retrieved markers to determine a proficiency level.

48. The computer program product of claim 37, wherein:
the computer program code for determining a user proficiency level with respect to a user interface comprises computer program code for determining a user proficiency level with respect to a user interface of a web-resident application being run from a client machine; and
the computer program code for automatically configuring the at least one functional component of the user interface of the application program and the at least one functional component of the user interface of the operating system comprises computer program code for automatically configuring at least one functional user interface element for the web-resident application.

49. A system for configuring a user interface of an application program and a user interface of an operating system of a computer system, the computer system including a plurality of application programs, the system comprising:
a marker storage device for,
storing a plurality of application program markers, each application program marker associated with one of the plurality of application programs, and indicating a user interaction with the associated one of the application programs; and
storing a plurality of operating system markers, each operating system marker indicating a user interaction with the operating system, the operating system markers including an indication of a total number of currently opened application programs;
a user proficiency level determiner, executed by the computer system and coupled to the marker storage device, for
assigning weights to each of the plurality of application program markers and each of the plurality of operating system markers;
determining a weighted score as a function of a subset of the weighted operating system markers and a subset of the weighted application program markers; and
determining a user proficiency level with respect to the user interface of the application program and the user interface of the operating system based at least in part upon the weighted score; and
a user interface configuration module, executed by the computer system and coupled to the user proficiency level determiner, for
automatically configuring at least one functional component of the user interface of the application program and at least one functional component of the user interface of the operating system responsive to the user proficiency level.

50. The system of claim 49, wherein the user interface configuration module selects at least one configuration option from a plurality of configuration options.

51. The system of claim 49, wherein the user interface configuration module comprises program code for performing the functions of:
enabling access to a functional user interface element;
disabling access to a functional user interface element; and
changing an appearance of a functional user interface element; and
wherein the user interface configuration module selects at least one of the functions to configure the user interface of the software application and the user interface of the operating system.

52. The system of claim 49, wherein the user interface configuration module comprises program code for performing the functions of:
enabling access to a command;
disabling access to a command;
changing an appearance of a command;
enabling access to a menu;
disabling access to a menu;
changing an appearance of a menu;
enabling access to a button;
disabling access to a button;
changing an appearance of a button;
enabling access to a shortcut; and
disabling access to a shortcut; and
wherein the user interface configuration module selects at least one of the functions to configure the user interface of the software application and the user interface of the operating system.

53. The system of claim 49, wherein the user proficiency level detector and the user interface configuration module operate responsive to a trigger event.

54. The system of claim 49, wherein the user proficiency level determiner and the user interface configuration module operate periodically.

55. The system of claim 49, wherein the user proficiency level determiner reads a stored user proficiency level derived from at least one weighted marker.

56. The system of claim 49, wherein:
the user proficiency level determiner determines the user proficiency level with respect to a user interface component less than the entire user interface of the operating system; and
the user interface configuration module automatically configures the at least one functional component of each user interface comprises automatically configuring the functional component without altering the configuration of the remainder of the user interface.

57. The system of claim 49, wherein:
the user proficiency level determiner determines the user proficiency level with respect to a selected one of the plurality of application programs; and
the user interface configuration module automatically configures the at least one functional component of the user interface for the selected one of the plurality of application programs.

58. The system of claim 49, further comprising:
a marker storage device for, responsive to user behavior with respect to either user interface, storing a corresponding weighted marker;
wherein the user proficiency level determiner reads the stored weighted marker from the marker storage device.

59. The system of claim 49, wherein the user proficiency level determiner retrieves a plurality of stored weighted markers and aggregates the retrieved markers to determine a weighted score.

60. The system of claim 49, wherein:
the user proficiency level determiner determines a user proficiency level with respect to a user interface of a web-resident application being run from a client machine; and
the user interface configuration module automatically configures at least one functional user interface element for the web-resident application.

61. A computer-implemented user interface configuration method, for configuring a user interface of an application program and a user interface of an operating system of a computer system, the computer system including a plurality of application programs, the method comprising:
determining a user proficiency level with respect to the user interface of the application program and user interface of the operating system based upon a total number of application programs currently open, a historical average number of concurrently open applications, a total number of windows currently open, and a historical average number of concurrently open windows; and
automatically configuring at least one functional component of the user interface of the application program and at least one functional component of the user interface of the operating system responsive to the user proficiency level.

* * * * *

UNITED STATES PATENT AND TRADEMARK OFFICE
CERTIFICATE OF CORRECTION

| | | |
|---|---|---|
| PATENT NO. | : 7,620,894 B1 | Page 1 of 1 |
| APPLICATION NO. | : 10/682645 | |
| DATED | : November 17, 2009 | |
| INVENTOR(S) | : Jessica Kahn | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 805 days.

Signed and Sealed this

Twenty-sixth Day of October, 2010

David J. Kappos
*Director of the United States Patent and Trademark Office*